S. S. MARX.
CAMPING TRAILER.
APPLICATION FILED JULY 26, 1917.

1,276,388.

Patented Aug. 20, 1918.
2 SHEETS—SHEET 1.

Inventor
Sidney S Marx
By A.B.Bowman
Attorney

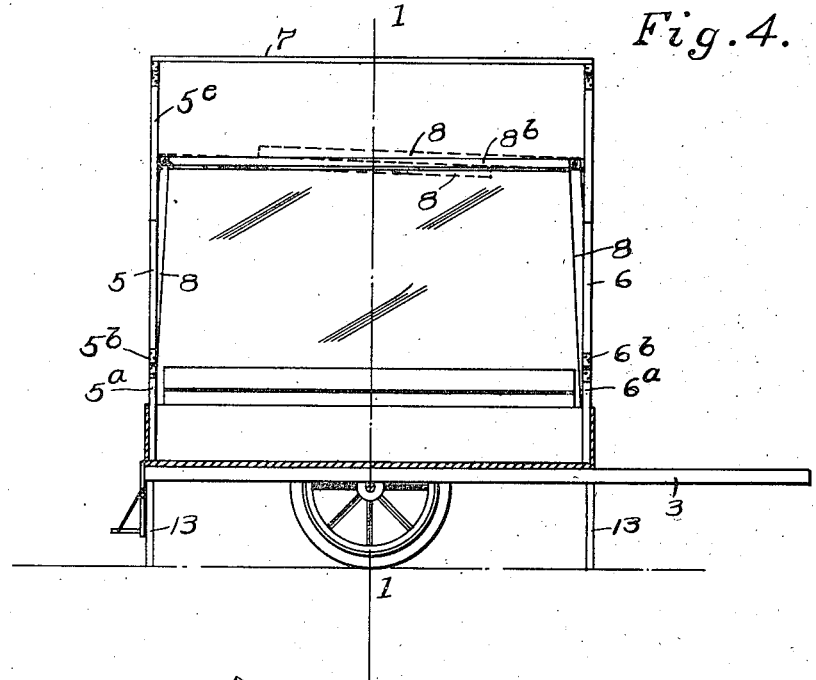
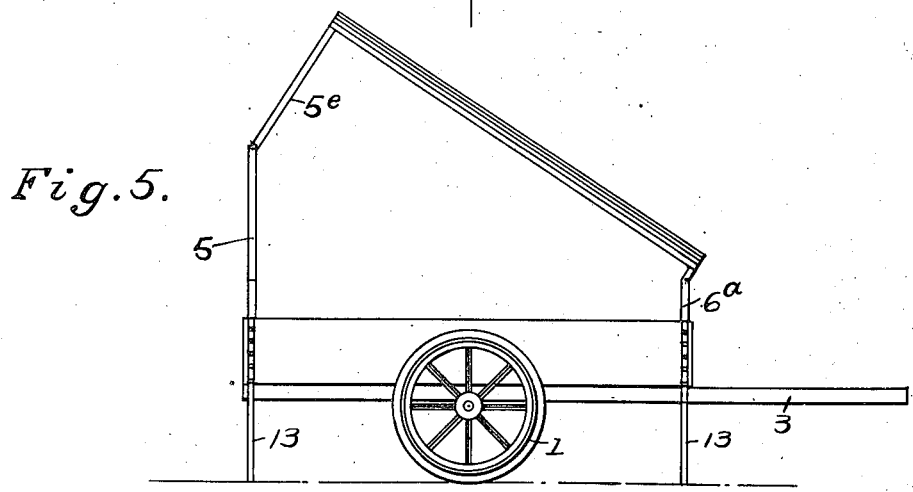
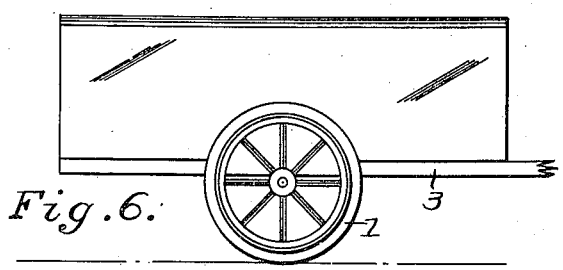

UNITED STATES PATENT OFFICE.

SIDNEY S. MARX, OF SAN DIEGO, CALIFORNIA.

CAMPING-TRAILER.

1,276,388.　　　　　Specification of Letters Patent.　　Patented Aug. 20, 1918.

Application filed July 26, 1917. Serial No. 182,887.

*To all whom it may concern:*

Be it known that I, SIDNEY S. MARX, a citizen of the United States, residing at San Diego, in the county of San Diego and State of California, have invented certain new and useful Improvements in Camping-Trailers, of which the following is a specification.

My invention relates to a trailer to be hauled behind an automobile, which trailer carries beds and bedding and other camping material for camping purposes, and the objects of my invention are: first, to provide a camping trailer of this class which provides a maximum of strength and durability with very light weight; second, to provide a trailer of this class which may be formed into a very compact form for traveling and still provides commodious quarters for two full sized beds and dressing room when opened out ready for use; third, to provide a trailer of this class which is so constructed that one person, either gentleman or lady, can easily manipulate the same alone and convert it from the compact form to the opened form for use, and back to the compact form with ease and in a very short time; fourth, to provide a trailer of this class composed largely of tenting which tenting is automatically stretched with the unfolding of some of the parts; and fifth, to provide a trailer of this class which is very simple and economical of construction, durable, easy to operate, comfortable, commodious, and which will not readily deteriorate or get out of order.

Figure 1:
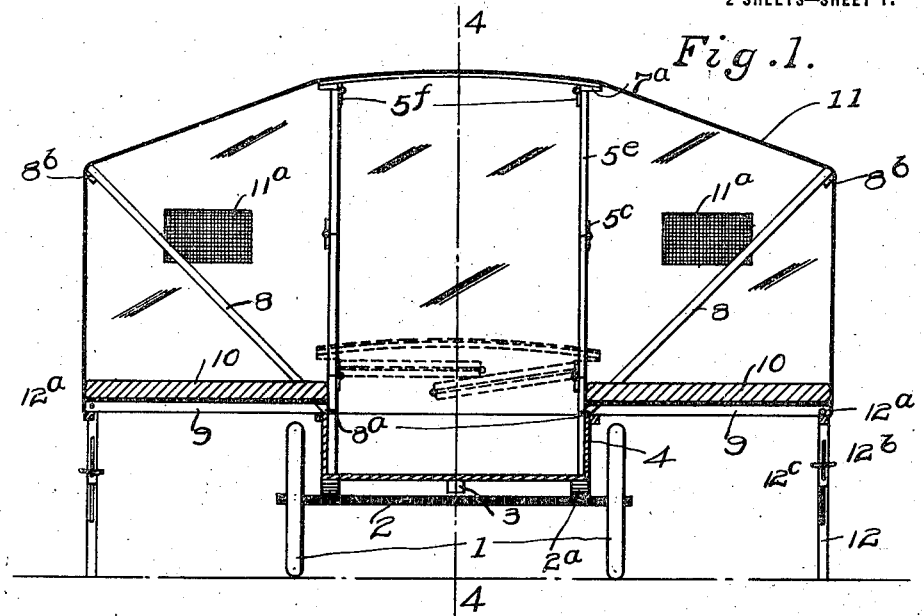
Figure 2:
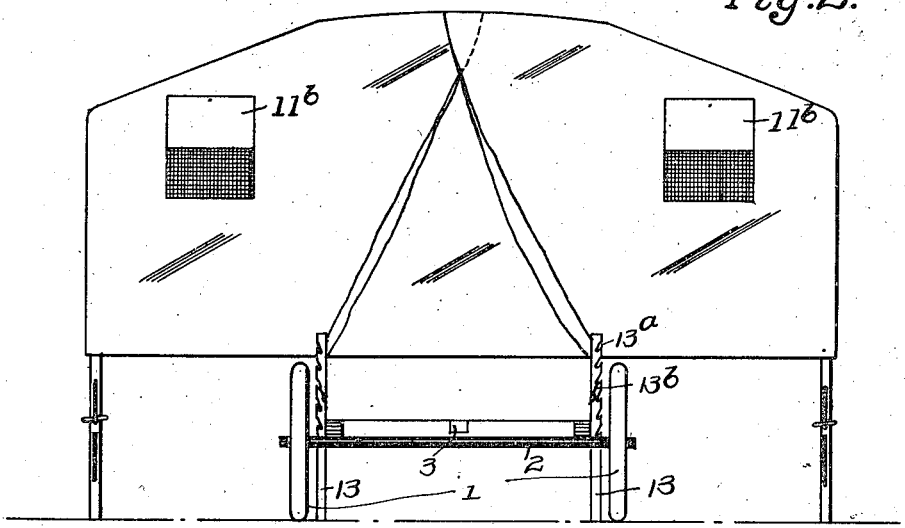
Figure 3:
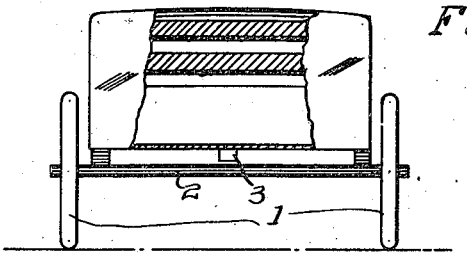

With these and other objects in view as will appear hereinafter, my invention consists of certain novel features of construction, combination and arrangement of parts as will be hereinafter described in detail and particularly set forth in the appended claims, reference being had to the accompanying drawings and to the characters of reference thereon which form a part of this specification in which:

Figure 1 is a transverse sectional view of the trailer through 1—1 of Fig. 4 and showing the trailer opened and ready for sleeping purposes and showing by dotted lines the main central or supporting portion in the collapsed position when ready for traveling; Fig. 2 is a rear end elevational view of the trailer when opened ready for use; Fig. 3 is a rear end elevational view of the trailer when folded up in compact form ready for traveling and showing a portion broken away and in section to facilitate the illustration; Fig. 4 is a longitudinal sectional view through 4—4 of Fig. 1 and showing the folded positions of the support 8 by dotted lines; Fig. 5 is a side elevational view of the wood frame portion minus the canvas, showing the main portion collapsed at one end and showing the position of the frame while being taken down; Fig. 6 is a side elevational view of the trailer when folded up in compact form ready for traveling.

Similar characters of reference refer to similar parts throughout the several views of the drawings.

The wheels 1, axle 2, tongue and support 3, box 4, rear end roof frame support 5, front end roof frame support 6, roof frame 7, brace supports 8, spring mattresses 9, bed mattresses 10, tenting cover 11, bed supports 12, and trailer supports 13 constitute the principal parts of my trailer structure.

The wheels 1 are the ordinary rubber tire type of wheel and they are revolubly mounted on the axle 2 and supported on the axle 2 by means of the springs $2^a$ is the box 4 to which is secured the tongue 3, which extends lengthwise of the box 4 for reinforcing said box. The wheels, axle, and body are substantially of the ordinary or conventional type of commercial trailer. Secured in the corners of the box in the rear end are the uprights $5^a$ and in the front of the box are the uprights $6^a$, and secured to the upper ends of these uprights are the hinges $5^b$ and $6^b$, and to the other members of these hinges $5^b$ and $6^b$ are secured the foldable members 5 and 6 and to the opposite ends of these foldable members 5 and 6 are secured the hinges $5^c$ and to the other members of the hinges $5^c$ are secured the upper foldable members $5^e$ on the upper ends of which are secured hinges $5^f$, to the other members of which are secured the roof supports $7^a$, upon which is rigidly secured the roof frame 7 which consists preferably of a plurality of slats running longitudinally with the box. It will be here noted that the connection between the members 5 and 5ᶜ is a pivotal connection at right angles to the hinge members so as to permit the members 5ᶜ to be moved at an angle to the member 5 as shown best in Fig. 5 of the drawings when collapsing the frame or in raising it from its collapsed position. The tenting cover 11 is a one piece canvas shaped as shown best in Figs. 1 and 2 of the drawings and it is secured to and over the roof frame 7 as shown best in Figs. 1 and 2 of the drawings, and the spring mattresses 9 are placed with one of their sides resting on the box when the trailer is opened for use as shown best in Fig. 1 of the drawings, and the opposite sides of said spring mattresses are supported by means of the adjustable supports 12 which are pivotally connected to said spring mattresses at points 12ᵃ. The supports 12 are composed of two members, each provided with longitudinal slots 12ᵇ and are held at certain relations to each other by means of a bolt and winged nut 12ᶜ so that the length of the support 12 may be adjusted to suit the position of the ground upon which the trailer is located, thus providing for supporting the same on rough ground. In order to support the portion of the canvas cover 11 over the beds 10, there are provided the brace supports 8 which are provided at their lower inner ends with pins 8ᵃ adapted to enter holes in the supports 5ᵃ and 6ᵃ, and their upper ends are pivotally connected to a support 8ᵇ for connecting the two end supports together and said support 8ᵇ is secured to the canvas cover and holds said cover in stretched position as shown best in Figs. 1 and 2 of the drawings. It will be here noted that the supports 8 being pivoted to the support 8ᵇ permit them to fold up against the support 8ᵇ into a compact form as shown best by dotted lines in Fig. 4 of the drawings after which they may be placed between the foldable ends 5 and 6 together with the canvas cover to which the support 8ᵇ is secured before collapsing the ends 5 and 6. The lower end of the canvas cover is secured to the spring mattresses and the supports 8 and 8ᵇ drop into position against the cover holding said cover taut. The cover 11 is provided in opposite ends with holes 11ᵃ which are provided with screens which are adapted to be covered with flaps 11ᵇ as shown best in Fig. 2 of the drawings. In order to support the trailer in position and level it up, there is provided at each corner a support 13 which is provided with a plurality of angular notches 13ᵃ adapted for the link 13ᵇ, which is pivotally secured to the box 4 so that the trailer may be supported upon the support 13 instead of on the wheels, or in addition to the wheels as desired.

Though I have shown and described a particular construction, combination and arrangement of parts, I do not wish to be limited to this particular construction, combination and arrangement, but desire to include in the purview of my invention the construction, combination and arrangement substantially as set forth in the appended claims.

It is obvious that with this construction there is provided a trailer for camping purposes which may be readily converted from a compact form for traveling purposes ready for use as commodious bed apartments by one person in a very short time. That the tent cover is made in one piece which is raised when the frame is raised and collapses when the frame is collapsed. That the frame structure is made collapsible so as to collapse one end at a time so that one person can easily manipulate the same. That the supports 8 and 8ᵇ readily take their proper position and hold the tent cover taut at all times over the bed when open. That the trailer as a whole is, very simple, light, durable, convenient, compact, and commodious.

Having thus described my invention, what I claim as new and desire to secure by Letters Patent is:

1. In a camping trailer the combination with an ordinary commercial trailer provided with a box, of a tent supporting frame composed of collapsible members, folding transversely, a roof frame secured on the normally upper end of said collapsible frame, a one piece canvas covering secured to said roof frame and extending over space enough to cover beds on the opposite sides of said box and foldable means secured to said canvas covering adapted to hold said canvas covering outwardly to form a compartment over each of said beds, whereby said canvas covering is held taut and in the proper shape and is collapsed with said collapsible frame.

2. In a camping trailer the combination with a two-wheeled cart provided with a box of uprights secured at each corner of said box, said uprights collapsible so as to fold one end at a time into compact form transversely across said box, a roof frame secured to the normally upper end of said collapsible frame, a one piece canvas covering secured over said roof frame and extending far enough on the opposite sides of said box to cover beds resting on the sides of said box, whereby said canvas covering is collapsed with the collapsing of said frame.

3. In a camping trailer the combination with a two-wheeled cart provided with a box, of uprights secured in each corner of said box, said uprights collapsible so as to fold transversely across said box into compact form one end at a time, a roof frame secured on the normally upper end of said collapsible frame, a one piece canvas covering secured over said roof frame, beds resting on the sides of said box, ridge poles with folding supports secured to the extending portion of said canvas covering, whereby said canvas covering is held taut and is automatically collapsed with the folding of said supports and the collapsing of said frame.

In testimony whereof, I have hereunto set my hand at San Diego, California, this 18 day of July, 1917.

SIDNEY S. MARX.